United States Patent [19]
Borrelli et al.

[11] Patent Number: 5,252,524
[45] Date of Patent: Oct. 12, 1993

[54] POLARIZING GLASSES

[75] Inventors: Nicholas F. Borrelli, Elmira; Josef C. Lapp; David W. Morgan, both of Corning, all of N.Y.

[73] Assignee: Corning Incorporated, Corning, N.Y.

[21] Appl. No.: 962,111

[22] Filed: Oct. 16, 1992

[51] Int. Cl.$^5$ .......................... C03C 3/11; C03C 4/00; C03C 3/095

[52] U.S. Cl. ...................................... 501/56; 501/13; 501/64

[58] Field of Search .............................. 501/13, 56, 64; 65/30.11

[56] References Cited

U.S. PATENT DOCUMENTS

| | | | |
|---|---|---|---|
| 3,653,863 | 4/1972 | Aroujo et al. | 65/30.11 |
| 4,282,022 | 8/1981 | Lo et al. | 65/85 |
| 4,304,584 | 12/1981 | Borrelli et al. | 65/30.11 |
| 4,479,819 | 10/1984 | Borrelli et al. | 65/30.11 |
| 4,908,054 | 3/1990 | Jones et al. | 65/30.11 |

*Primary Examiner*—Mark L. Bell
*Assistant Examiner*—David R. Sample
*Attorney, Agent, or Firm*—Clinton S. Janes, Jr.

[57] ABSTRACT

This invention is directed to a glass containing elongated silver halide crystals selected from the group consisting of AgCl, AgBr, AgI, and mixtures thereof which is capable of polarizing radiation in the visible portion of the radiation spectrum and which does not exhibit photochromism when exposed to radiation in the ultraviolet/visible portions of the radiation spectrum, wherein the composition of the glass is essentially free of copper and includes an amount of $CeO_2$ effective to retain the silver in the glass composition in the oxidized state.

5 Claims, No Drawings

POLARIZING GLASSES

BACKGROUND OF THE INVENTION

Corning Incorporated, Corning, N.Y., has marketed glass lenses which polarize radiation in the red to near infrared portion of the radiation spectrum for a number of years under the trademark POLARCOR ®. Those lenses are prepared in accordance with the method described in U.S. Pat. No. 4,479,819 (Borrelli et al.). As is explained in that patent, the method involves four fundamental steps:

(a) a glass article of a desired configuration is fashioned from a composition containing silver and at least one halide from the group of chloride, bromide, and iodide;

(b) that glass article is heated to a temperature above the strain point, but not higher than about 50° C. above the softening point of the glass, for a sufficient period of time to generate crystals therein of AgCl, AgBr, and/or AgI;

(c) that crystal-containing article is elongated under stress at a temperature above the annealing point, but below that at which the glass exhibits a viscosity of about $10^8$ poises, such that the crystals are elongated to an aspect ratio of at least 5:1, and thereafter;

(d) that article is exposed to a reducing environment at a temperature above about 250° C., but no higher than about 25° C. above the annealing point of the glass, for a sufficient length of time to develop a chemically reduced surface layer on the article wherein at least a portion of the elongated silver halide particles is reduced to elemental silver.

Three different general base types of silver halide-containing glass compositions are disclosed therein: (1) glasses containing copper which exhibit photochromic behavior; (2) glasses having similar base compositions, but wherein copper is absent so that the glasses do not exhibit photochromic behavior; and (3) glasses having compositions in the alkali metal oxide borosilicate system containing high levels of $B_2O_3$ which do not display photochromic behavior. Readily-reducible metal oxides, such as PbO and $Bi_2O_3$ will be avoided.

In the preferred embodiment of the first two types of glasses, each had a base composition consisting essentially, expressed in terms of weight percent on the oxide basis, of 6–20% $R_2O$, wherein $R_2O$ consists of 0–2.5% $Li_2O$, 0–9% $Na_2O$, 0–17% $K_2O$, and 0–6% $Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio $R_2O:B_2O_3$ ranging between about 0.55–0.85, where the composition is essentially free from divalent metal oxides other than CuO, and the weight ratio Ag:(Cl+Br) ranging about 0.65–0.95. In the second type of glass, CuO is omitted from the composition such that the glass does not demonstrate photochromism.

The third type of glass containing silver halide crystals may contain copper and consists essentially, expressed in terms of weight percent on the oxide basis, of 5–12 alkali metal oxides, 1–15% $Al_2O_3$, 27–35% $B_2O_3$, and the remainder $SiO_2$, the molar ratio $(R_2O-Al_2O_3):B_2O_3$ preferably being less than 0.25.

The elongated metallic silver particles can polarize light in the visible and/or near infrared regions of the radiation spectrum depending upon the size and aspect ratio of the elongated silver halide crystals. Nevertheless, inasmuch as the preferred reducing treatment penetrates the glass only to a depth of about 20 microns, a large population of photochromic silver halide crystals will be left in the glass matrix of the first type of glass described above. (The depth to which the reducing heat treatment penetrates is controlled by the time and temperature of the treatment.) The phenomenon of photochromic behavior is of no consequence when the polarizing effect takes place in the infrared regime of the radiation spectrum. Photochromism becomes a problem, however, where polarization in the visible portion of the radiation spectrum is desired.

As was discussed above, copper-free, silver halide-containing glasses which display no photochromic behavior have been prepared. Unfortunately, whereas photochromism was not displayed by the glasses, the silver was reduced to the metallic state during melting of the glass batch or during the subsequent heat treatment to generate silver halide crystals. That action is evidenced in the formation of a red colored glass. This premature reduction of the silver precludes the formation of silver halide crystals in the subsequent heat treatment. As indicated in U.S. Pat. No. 4,479,819, supra, the elongated silver halide crystals, wherein at least a portion thereof is reduced to elemental silver, imparts the polarizing capability to the glass.

The mechanism via which the inclusion of copper inhibits the reduction of $Ag^+$ ions to $Ag^\circ$ metal has been explained as follows. The presence of $Cu^{+2}$ ions in the glass composition provides protection against the reduction of $Ag^+$ ions to $Ag^\circ$ by the reaction $Cu^{+2} \rightarrow Cu^+$. Hence, the elimination of copper from the glass removes this protection, thereby allowing the reaction $Ag^+ \rightarrow Ag^\circ$ to take place.

Therefore, the primary objective of the present invention was to develop glass compositions containing silver halides which, when heat treated to generate silver halide crystals that can be elongated to impart polarizing properties to the glasses, would not exhibit photochromism when exposed to radiation in the ultraviolet/visible portions of the radiation spectrum, and wherein silver ions present in the glasses would not be reduced to metallic silver during the melting process or the heat treatment step.

SUMMARY OF THE INVENTION

Our invention is based upon our discovery of means to retain this silver in the glass in the oxidized state during melting of the glass and during the silver halide crystal growth phase of the process, while assuring that the glass will not exhibit photochromism. In broadest terms our invention contemplates a silver halide-containing base glass which is essentially free of monovalent copper to eliminate the development of photochromic behavior, and which contains a quantity of cerium, expressed in terms of $CeO_2$, effective to retain the silver in the oxidized state during melting of the glass and as the glass is heat treated to generate silver halide crystals therein. (As employed here, silver halide crystals denote AgCl, AgBr, and AgI.) Because these cerium additions effectively replace the trace amount of copper that functions both in the photochromic process and as an oxidizer of silver, only very small concentrations of $CeO_2$ are necessary. The minimum amount of cerium required to maintain the silver in the oxidized state is dependent upon the overall oxidation state of the glass which, in turn, is impacted both by glass composition and by the conditions present during melting of the batch materials. Therefore, the minimum operable level of CeO$_2$ has not been determined with ultimate certainty. Nevertheless, our laboratory investigations have demonstrated that concentrations at least as low as 0.01% by weight CeO$_2$ are effective under certain conditions. Much greater amounts, e.g., up to 1.5% by weight CeO$_2$ and higher, are likewise effective, but provide no substantive advantages over lesser amounts. And because CeO$_2$ is a relatively expensive material, 1.5% has been deemed to constitute a practical maximum, with levels between about 0.075–0.75% by weight being preferred.

In the preferred embodiments of the invention, the base glass composition will be selected from the following three groups, expressed in terms of weight percent on the oxide basis:

(1) 6–20% R$_2$O, wherein R$_2$O consists of 0–2.5% Li$_2$O, 0–9% Na$_2$O, 0–17% K$_2$O, and 0–6% Cs$_2$O, 14–23% B$_2$O$_3$, 5–25% Al$_2$O$_3$, 0–25% P$_2$O$_5$, 20–65% SiO$_2$, 0–2.5% TiO$_2$, 0–5% ZrO$_2$, 0.15–0.35% Ag, 0.1–0.36% Cl, and 0.1–0.2% Br, the molar ratio R$_2$O:B$_2$O$_3$ ranging between about 0.55–0.85, and the weight ratio Ag:(Cl+Br) ranging about 0.5–0.95; or (2) 2–2.5% Li$_2$O, 3–5% Na$_2$O, 6–7% K$_2$O, 9–10% Al$_2$O$_3$, 19–20.5% B$_2$O$_3$, 0–0.25% PbO, 0.1–0.3% Ag, 0.2–0.5% Cl, 0.05–0.15% Br, and 55–60% SiO$_2$, or (3) 3.75–4.5% Li$_2$O, 0–1% Na$_2$O, 5.5–7.5% K$_2$O, 7–8% Al$_2$O$_3$, 18–22% B$_2$O$_3$, 0–2% TiO$_2$, 0–5% ZrO$_2$, 54–58% SiO$_2$, 0–0.08% PbO, 0–0.2% Sb$_2$O$_3$, 0.2–0.33% Ag, 0.3–0.5% Cl, and 0.04–0.12% Br.

DESCRIPTION OF PREFERRED EMBODIMENTS

Table I records a number of glass compositions, expressed in terms of parts by weight on the oxide basis, illustrating the parameters of the present invention. Inasmuch as it is not known with which cation(s) the halides are combined and the levels thereof are so small, they are simply reported as the halide. In like manner because the amounts are so small, the silver concentrations are recited as silver metal. Furthermore, in view of the fact that the sum of the individual components closely approximates 100, for all practical purposes the value listed for each component may be deemed to represent weight percent. Finally, the actual batch ingredients used in preparing the glasses can comprise any materials, either oxides or other compounds, which, when melted together, will be converted into the desired oxides in the proper proportions. For example, Li$_2$CO$_3$, Na$_2$CO$_3$, and K$_2$CO$_3$ can comprise the batch materials of Li$_2$O, Na$_2$O, an K$_2$O, respectively. Table IA presents the glass compositions of Table I (except for the halide constituents) expressed in terms of approximate cation percent.

The batch ingredients were compounded, ballmilled together to assist in obtaining a homogeneous melt, and charged into platinum crucibles. After placing lids thereon, the crucibles were moved into an electrically heated furnace operating at 1450° C. and, with occasional stirring, retained therewithin for four hours. The melts were then poured into metal molds to form glass slabs having dimensions of 4"×7"×0.5" (~10.2×17.8×1.3 cm), and those slabs were immediately transferred to an annealer operating at 480° C. Samples were cut from the slabs for use in various tests. The samples exhibited no red color, thereby indicating the absence of silver metal.

It will be appreciated that the above description reflects laboratory melting and forming only, and that large scale melts thereof can be carried out in commercial melting units with the resultant molten glass being shaped employing conventional glass forming techniques and equipment. It is only necessary that the batch ingredients be melted at a temperature and for a time sufficient to produce a homogeneous melt.

TABLE I

|  | 1 | 2 | 3 | 4 | 5 | 6 | 7 | 8 | 9 | 10 |
|---|---|---|---|---|---|---|---|---|---|---|
| SiO$_2$ | 56.3 | 55.9 | 56.3 | 55.6 | 57.2 | 58.8 | 58.8 | 58.4 | 58.0 | 58.7 |
| B$_2$O$_3$ | 18.1 | 17.9 | 18.1 | 17.8 | 18.4 | 19.5 | 19.5 | 19.4 | 19.2 | 19.4 |
| Al$_2$O$_3$ | 6.2 | 6.1 | 6.2 | 6.1 | 6.3 | 9.6 | 9.6 | 9.5 | 9.4 | 9.5 |
| Li$_2$O | 1.8 | 1.8 | 1.8 | 1.8 | 1.8 | 2.2 | 2.2 | 2.2 | 2.2 | 2.2 |
| Na$_2$O | 4.1 | 4.0 | 4.1 | 4.0 | 4.1 | 3.0 | 3.0 | 3.0 | 3.0 | 3.0 |
| K$_2$O | 5.7 | 5.7 | 5.7 | 5.6 | 5.8 | 6.3 | 6.3 | 6.2 | 6.2 | 6.3 |
| TiO$_2$ | 2.3 | 2.2 | 2.3 | 2.2 | — |  |  |  |  |  |
| ZrO$_2$ | 5.0 | 4.9 | 5.0 | 4.9 | 5.1 |  |  |  |  |  |
| Ag | 0.22 | 0.22 | 0.22 | 0.22 | 0.23 | 0.22 | 0.22 | 0.22 | 0.22 | 0.22 |
| CuO | 0.006 | 0.006 | — | — | — | 0.008 | — | — | — | — |
| CeO$_2$ | — | 0.594 | — | 1.18 | 0.607 | — | — | 0.61 | 1.2 | 0.18 |
| Cl | 0.24 | 0.24 | 0.24 | 0.24 | 0.24 | 0.40 | 0.40 | 0.40 | 0.40 | 0.40 |
| Br | 0.20 | 0.20 | 0.20 | 0.20 | 0.20 | 0.08 | 0.08 | 0.08 | 0.08 | 0.08 |

TABLE IA

| | (Cation %) | | | | |
|---|---|---|---|---|---|
|  | 1 | 2 | 3 | 4 | 5 |
| SiO$_2$ | 46.4 | 46.4 | 46.4 | 46.4 | 46.4 |
| B$_2$O$_3$ | 25.7 | 25.7 | 25.7 | 25.7 | 25.7 |
| Al$_2$O$_3$ | 6.0 | 6.0 | 6.0 | 6.0 | 6.0 |
| Li$_2$O | 6.0 | 6.0 | 6.0 | 6.0 | 6.0 |
| Na$_2$O | 6.5 | 6.5 | 6.5 | 6.5 | 6.5 |
| K$_2$O | 6.0 | 6.0 | 6.0 | 6.0 | 6.0 |
| TiO$_2$ | 1.4 | 1.4 | 1.4 | 1.4 | — |
| ZrO$_2$ | 2.0 | 2.0 | 2.0 | 2.0 | 2.0 |
| Ag | 0.10 | 0.10 | 0.10 | 0.10 | 0.10 |
| CuO | 0.004 | 0.004 | — | — | — |
| CeO$_2$ | — | 0.172 | — | 0.344 | 0.172 |

| | (Concl.) | | | | |
|---|---|---|---|---|---|
|  | 6 | 7 | 8 | 9 | 10 |
| SiO$_2$ | 47.0 | 47.0 | 47.0 | 47.0 | 47.0 |
| B$_2$O$_3$ | 26.9 | 26.9 | 26.9 | 26.9 | 26.9 |
| Al$_2$O$_3$ | 9.0 | 9.0 | 9.0 | 9.0 | 9.0 |
| Li$_2$O | 7.0 | 7.0 | 7.0 | 7.0 | 7.0 |
| Na$_2$O | 4.7 | 4.7 | 4.7 | 4.7 | 4.7 |
| K$_2$O | 6.4 | 6.4 | 6.4 | 6.4 | 6.4 |
| Ag | 0.10 | 0.10 | 0.10 | 0.10 | 0.10 |
| CuO | 0.005 | — | — | — | — |
| CeO$_2$ | — | — | 0.17 | 0.34 | 0.05 |

Example 1 is a laboratory melt of Corning Code 8112, a photochromic glass marketed by Corning Incorporated, Corning, N.Y. Example 6 is a laboratory melt of Corning Code 8124, another photochromic glass marketed by Corning Incorporated. Each of those glasses relies upon the presence of silver halide crystals to impart photochromism thereto, and each was utilized as a baseline to investigate the actions of copper and $CeO_2$ in developing non-photochromic polarizing glasses.

Each of the Examples in the form of a 2.0 mm thick plate sample with polished surfaces was heat treated for 30 minutes at 660° C. to test for photochromic performance. In Table II below, $T_o$ is the transmittance of the glass prior to darkening; $T_{D15}$ is the transmittance of the glass after an exposure of 15 minutes to a "black light blue" ultraviolet radiation emitting lamp, and $T_{F5}$ is the transmittance of the glass five minutes after removal from exposure to ultraviolet radiation. A heat treatment for 30 minutes at 660° C. is utilized in the commercial production of Corning Code 8112 glass to develop photochromism therein.

The previously heat treated samples were thereafter heated to 720° C. and held at that temperature for two hours to determine their suitability for polarizing visible radiation. The 720° C. heat treatment is currently employed in the fabrication of POLARCOR ® products.

Table II records the visual appearance of the initially heat treated samples to generate silver halide crystals in the glass, along with a description of the appearance of the subsequently heat treated samples to determine their potential for polarizing visible radiation. In Table II, "Ext." denotes extremely hazy and "V.sl." denotes very slightly hazy.

TABLE II

|  | 1 | 2 | 3 | 4 | 5 |
|---|---|---|---|---|---|
| Heat Treated 660° C. For 30 Minutes | | | | | |
| $T_o$ | 89.1 | 88.1 | 84.3 | 54.2 | 90.5 |
| $T_{D15}$ | 43.4 | 80.4 | 81.8 | 55.0 | 90.26 |
| $T_{F5}$ | 75.5 | 81.9 | 82.2 | 54.2 | 90.22 |
| Appearance | Slightly Hazy | Yellow | Amber | Amber Hazy | Slightly Yellow |
| Heat Treated 720° C. For 2 Hours | | | | | |
| Appearance | Very Hazy Blue-Gray | Very Hazy Slightly Yellow | Very Hazy Red | Ext. Hazy Gray | V.sl.Hazy Slightly Yellow |
| Heat Treated 660° C. For 30 Minutes | | | | | |
| $T_o$ | 91.2 | 81.8 | 90.4 | 87.6 | 89.2 |
| $T_{D15}$ | 50.1 | 73.3 | 87.2 | 85.0 | 86.3 |
| $T_{F5}$ | 83.5 | 74.1 | 87.4 | 85.1 | 86.4 |
| Appearance | Clear | Amber | Clear | Amber | Clear |
| Heat Treated 720° C. For 2 Hours | | | | | |
| Appearance | V.sl.Hazy Blue | V.sl.Hazy Red | V.sl.Hazy White | V.sl.Hazy Slightly Yellow | V.sl.Haze Pink |

As can be seen through an examination of Tables I and II, Examples 1 and 6 exhibit substantial photochromic behavior when subjected to a conventional heat treatment to develop photochromic properties. Example 2 is, in essence, Example 1 with 0.172 cation % $CeO_2$ added. It can be seen that this addition of $CeO_2$ effectively interrupts the photochromic mechanism, as is evidenced by the fact that the glass darkens only 8 percentage points. Example 3 is, in essence, Example 1 with the copper removed and, as would be expected, Example 3 is essentially non-photochromic. When heat treated at 720° C. for two hours, a conventional heat treatment to produce silver halide crystals which are stretched to impart polarizing properties to the glass, Example 3 takes on a red coloration, thereby indicating that the silver ions in the glass have been reduced to metallic silver. Example 4 has twice the concentration of $CeO_2$ of Example 2 with all of the copper oxide removed. Again, the glass was not photochromic and, upon heating to 720° C. for two hours, developed a gray haze, thereby indicating that copper can be completely eliminated from the composition without having the silver ions being reduced to metallic silver. Electron micrographs of Examples 1-4 heat treated for two hours at 720° C. identified the presence of rutile crystals therein. It was reasoned that their presence was the source of the observed haze in the Examples. It was speculated that the extreme haze and low value of $T_o$ exhibited by Example 4 may be due to a nucleating effect of the $CeO_2$ in relatively large amounts. To examine the effect of $TiO_2$, Example 5 was prepared which comprises Example 2 with all of the copper and titania removed. As can be seen, Example 5 does not demonstrate photochromism and, after heat treatment at 720° C., displays a very light haze with a slightly yellow appearance, thereby indicating (1) the action of $TiO_2$ crystals in fostering haze in the glass, and (2) that the silver ions were not reduced to metallic silver.

Based upon that experience regarding the effect of $TiO_2$, glass compositions 6-10 were prepared and tested, Example 6 being a laboratory melt of Corning Code 8124 glass which contains no intentionally included $TiO_2$. Example 6 manifests photochromic behavior and, after heat treatment at 720° C., exhibits very light haze and a blue coloration, the latter coloration indicating that the silver ions were not reduced to silver metal. Example 7, constituting in essence Example 6 with the CuO removed, was substantially non-photochromic and, after the 720° C. heat treatment, displayed a red appearance, thereby denoting the reduction of silver ions to metallic silver. Examples 8-10 utilize essentially the same base glass composition with various levels of $CeO_2$ added. Each glass is non-photochromic and the silver ions are not reduced in Examples 8 and 9. The pink tint exhibited in Example 10 is believed to evidence some reduction of silver ions to metallic silver. Accordingly, at least 0.25% by weight $CeO_2$ is most preferably included to assure retention of silver in the oxidized state in this glass.

Whereas the total removal of $TiO_2$ from the glass composition assures a minimum level of haze in the final product, its practical inclusion to adjust refractive index is quite useful. Further experimentation has demonstrated that concentrations up to about 1% by weight can be tolerated, particularly where the content of $CeO_2$ is maintained below about 0.75% by weight.

We claim:

1. A glass containing elongated silver halide crystals selected from the group consisting of AgCl, AgBr, AgI, and mixtures thereof which is capable of polarizing radiation in the visible portion of the radiation spectrum and which does not exhibit photochromism when exposed to radiation in the ultraviolet/visible portions of the radiation spectrum, wherein the composition of the glass is essentially free of copper and includes an amount of $CeO_2$ effective to retain the silver in the glass composition in the oxidized state.

2. A glass according to claim 1 wherein the composition therefor includes 0.01–1.5% by weight $CeO_2$.

3. A glass according to claim 1 the composition of which is selected from the following three groups consisting essentially, expressed in terms of weight percent on the oxide basis, of:

(a) 6–20% $R_2O$, wherein $R_2O$ consists of 0–2.5% $Li_2O$, 0–9% $Na_2O$, 0–17% $K_2O$, and 0–6% $Cs_2O$, 14–23% $B_2O_3$, 5–25% $Al_2O_3$, 0–25% $P_2O_5$, 20–65% $SiO_2$, 0–2.5% $TiO_2$, 0–5% $ZrO_2$, 0.15–0.35% Ag, 0.1–0.36% Cl, and 0.1–0.2% Br, the molar ratio $R_2O:B_2O_3$ ranging between 0.55–0.85, and the weight ratio Ag:(Cl+Br) ranging about 0.5–0.95; or (b) 2–2.5% $Li_2O$, 3–5% $Na_2O$, 6–7% $K_2O$, 9–10% $Al_2O_3$, 19–20.5% $B_2O_3$, 0–0.25% PbO, 0.1–0.3% Ag, 0.2–0.5% Cl, 0.05–0.15% Br, and 55–60% $SiO_2$; or (c) 3.75–4.5% $Li_2O$, 0–1% $Na_2O$, 5.5–7.5% $K_2O$, 7–8% $Al_2O_3$, 18–22% $B_2O_3$, 0–2% $TiO_2$, 0–5% $ZrO_2$, 54–58% $SiO_2$, 0–0.08% PbO, 0–0.2% $Sb_2O_3$, 0.2–0.33% Ag, 0.3–0.5% Cl, and 0.04–0.12% Br.

4. A glass according to claim 3 wherein 0.01–1.5% $CeO_2$ is included in each of the three groups of compositions.

5. A glass according to claim 4, wherein said $CeO_2$ is included in amounts of 0.075–0.75%.

* * * * *